Jan. 12, 1926. 1,569,002
R. F. CRUDGINTON ET AL
MEANS AND METHOD FOR PRESSING MOLDED ARTICLES
Filed July 5, 1924 6 Sheets-Sheet 3

INVENTORS
Robert F. Crudginton and
John T. Kilbride
BY
ATTORNEY

Jan. 12, 1926.                                                    1,569,002
R. F. CRUDGINTON ET AL
MEANS AND METHOD FOR PRESSING MOLDED ARTICLES
Filed July 5, 1924            6 Sheets-Sheet 4

INVENTORS
Robert F. Crudginton and
John T. Kilbride
BY
Ray Belmont Whitman
ATTORNEY Patented Jan. 12, 1926.

1,569,002

UNITED STATES PATENT OFFICE.

ROBERT F. CRUDGINTON AND JOHN T. KILBRIDE, OF BRIDGEPORT, CONNECTICUT, ASSIGNORS TO COLUMBIA PHONOGRAPH COMPANY, INC., OF BRIDGEPORT, CONNECTICUT, A CORPORATION OF NEW YORK.

MEANS AND METHOD FOR PRESSING MOLDED ARTICLES.

Application filed July 5, 1924. Serial No. 724,429.

*To all whom it may concern:*

Be it known that we, ROBERT F. CRUDGINTON and JOHN T. KILBRIDE, citizens of the United States, and residents of Bridgeport, county of Fairfield, and State of Connecticut, have invented certain new and useful Improvements in Means and Methods for Pressing Molded Articles, of which the following, taken in connection with the accompanying drawings, is a specification.

This invention relates to means and methods for forming articles of plastic materials. This means finds expression in a press particularly adapted for forming phonograph records.

The primary object of the invention is to provide a press for the purpose indicated, which is automatic in every operation within the press.

Another object is to provide a duplex press including automatically-operated units so timed that they alternate with each other in opening and closing.

A further object is to provide means whereby the fluid for closing the press also acts to admit the pressure fluid for squeezing the material contained in the press.

A still further object is to provide means whereby the operation of the valves, and thereby the press, may be controlled by the minimum of mechanically-operated apparatus.

An additional object is to provide a safety device which may be operated to instantly stop the closing movement of the press, after which it opens.

Yet another object is to provide a combined safety device and guard for any form of press.

A still further object is to provide a combined guard and safety device for hydraulic presses and the like, which when moved in the proper direction will operate to open an exhaust-valve and permit the escape of the fluid which is moving the press to closed position, thereby preventing closing of the press.

Yet another object is to provide an automatic mechanism giving the press a cycle of operations, such that the press opens to receive the raw record material, closes to subject the same to treatment, and opens again to permit the removal of the finished record.

Yet a further object is to provide a comparatively slow-closing press wherein the molded material may flow slowly over the matrices as they are pressed together, making for more accurate molding in all articles, and, in case of a phonograph record of laminated construction, preventing splitting of the paper sheet.

Also, an object is to provide a press having an exhaust-valve and means to operate the same automatically at regular intervals, together with manually-released means for opening the exhaust-valve at will.

Another object is to provide a press having a movable lower jaw adapted to gravitate to open position when released, the press being provided with means to release the jaw both automatically at regular intervals, and at will.

An additional object is to provide a duplex press wherein the discontinuance of the operation of one unit will not affect the operation of the other.

A further object is to provide a trigger-released weight-actuated means for opening the exhaust-valve of a press.

A further object is to provide a valve-actuating means including a trigger-released weight-actuated lever.

Another object is to provide a press including novel mounting means for the valve-actuating press.

A further object is to provide a press including means whereby the valve-actuating cams may be adjusted relatively.

Other objects of this invention will appear in the specification and claims below.

Referring to the drawings forming a part of this specification and in which the same reference characters are used throughout the various views to designate the same parts.

This invention includes a mechanism with two independent presses, together with the necessary piping and control means. The only difference between the two press units is in the respective positions of their controlling cams; these are so arranged that one press is open when the other is closed. Thus, a duplex press is provided wherein a finished record is being removed from, and record material placed in, one pressing unit, while a record is being formed in the other.

The structure of the two units being thus alike, they have both been completely illustrated in the accompanying drawings only diagrammatically, the following specification describing, in detail, only one of the units, but the same reference characters applying, of course, to both unless otherwise stated.

Referring, in detail, to the drawings, a press proper is shown at 10 (Figs. 1 and 9), the same being mounted on suitable frames 11 which are supported by a foundation 12. The press 10 is mounted at an incline and includes the stationary upper head or jaw 13 and the relatively movable lower jaw 14 designed to cooperate therewith. A hollow cylindrical portion 15 is integral with the upper jaw and forms with the ram 16 a hydraulic press construction, acting, when fluid under pressure is supplied thereto, to raise the lower jaw and close the press.

Figures 1, 2:
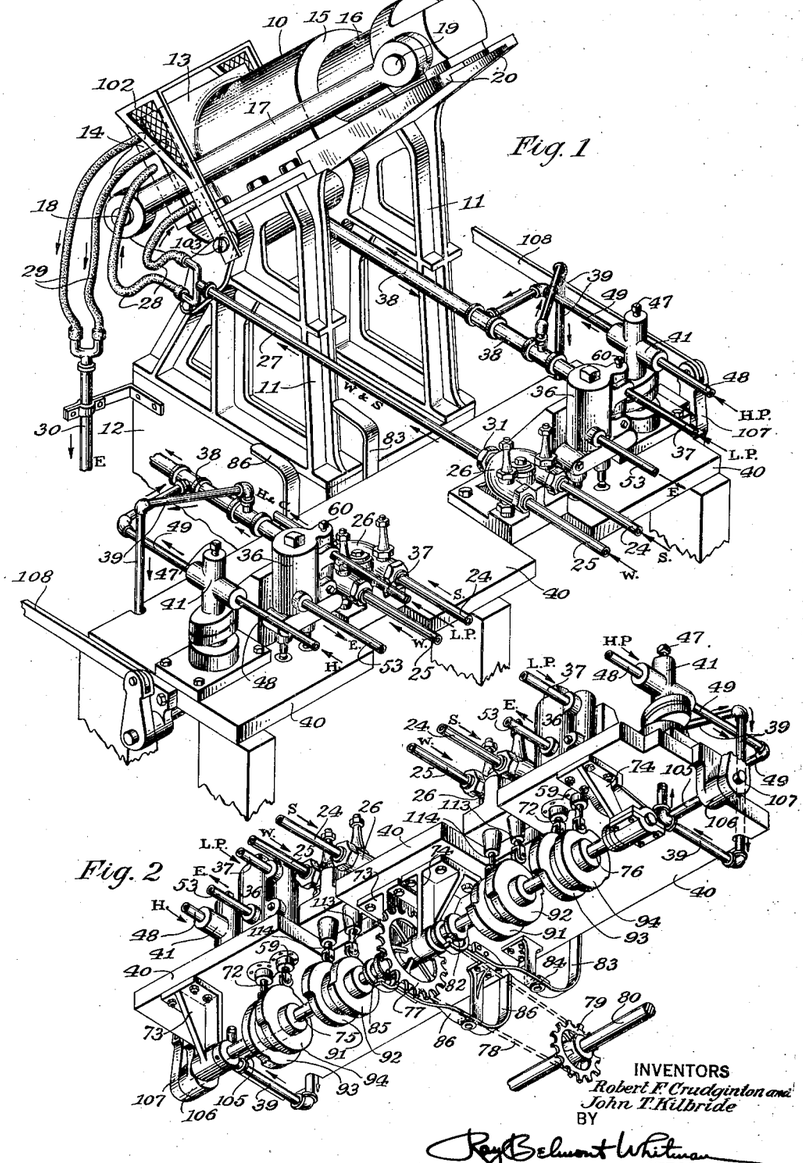
Figure 1 is a perspective view showing one press and its control valves and piping system on a suitabe support, and fragmentarily showing in the foreground the piping system and control valves for the other press of the duplex unit.
Figure 2 is a perspective view from the underside of the support shown in Fig. 1, and showing the controlling cams and means for actuating them.
Figures 3, 4, 5, 6, 7, 8:
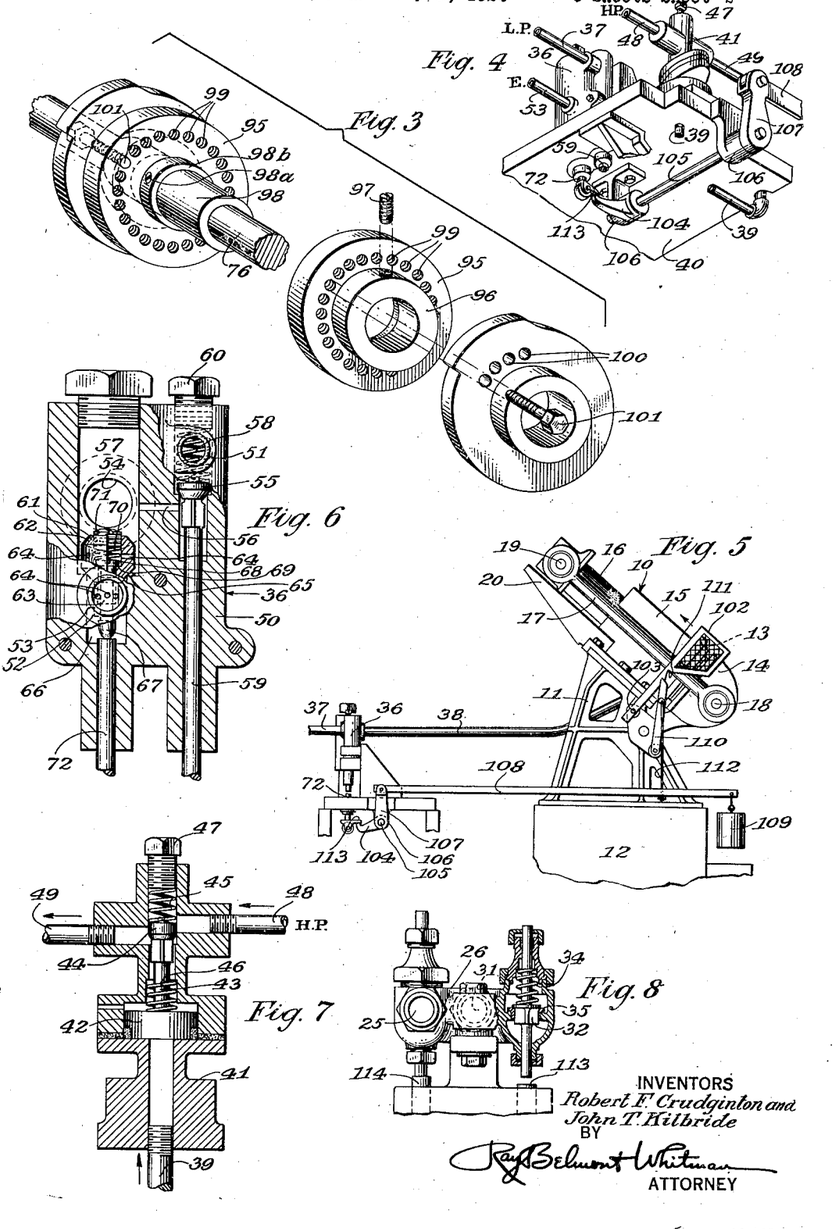
Fig. 3 is a disassembled perspective view illustrating the manner of assembling the cams, and the collars relative to which the cams may be adjusted.
Fig. 4 is a perspective view from below of an end portion of the safety means as shown in Fig. 2, parts being removed to show more clearly the connection between the safety device and the push rod for the exhaust or release valve.
Fig. 5 is a side view showing the construction and arrangement of the safety device and the relation the same bears to the remainder of the structure.
Fig. 6 is a fragmentary vertical sectional view of the combined low-pressure inlet-and-exhaust valve.
Fig. 7 is a vertical sectional view of the high-pressure inlet-valve.
Fig. 8 is a view partly in section, and partly in elevation, showing the valve mechanism for controlling the admission of steam and cold water.
Figure 9:
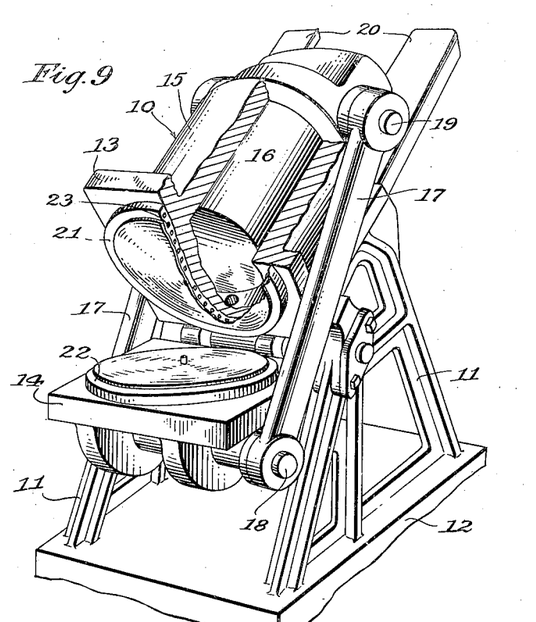
Fig. 9 is a perspective view of one pressing unit, parts of the same being broken away to show the water space beneath the ram, and to show the passage through the platens for the heating and cooling media.

The lower jaw 14 (Figs. 1 and 9) is connected to the ram 16 by means of connecting rods 17 pivoted at their lower ends to the jaw by means of pins 18 and pivoted at their upper ends to the ram by means of pins 19 (Figs. 1, 5, and 9). Extensions 20 of the frame 11 provide guides for the ram and also serve as a partial support for the same when the press is closed and the ram is forced outwardly. The weight of the lower jaw, together with the weight of the ram, serve to expel the fluid from the cylinder 15, and to move the jaw to open position when pressure is released.

The jaws 13 and 14 of the press are provided with platens 21 and 22, respectively, each carrying a forming matrix. The platens 21 and 22 are each provided with a number of passages 23 through which steam and cold water are alternately passed for heating the record stock and for cooling the pressed record. These platens may be of any form, but those used successfully are similar to the disclosure of the Burroughs Reissue Patent #15,608, dated May 22, 1923. While, with the exception of the diagrammatic views to be later described, there is but one press shown and described, as before stated, two are employed, the presses being preferably, though not necessarily, arranged side by side. The heating and cooling pipes are shown at 24 and 25, respectively, and marked "S" and "W" (Figs. 1 and 2). These supply pipes connect with a multiway valve 26 and the heating and cooling media (in this instance steam and water, respectively, are alternately passed to the platens 21 and 22 through the same pipe 27 (also marked "W & S") and flexible connections 28 one of which leads to one platen, and the other to the other. Other flexible connections 29, together with pipe 30, are provided as an outlet, or exhaust, (marked "E") to carry the condensed steam and used water away from the press. It will be understood that the heating and cooling media is not held in the platens but flows directly therethrough.

The valve 26 (Figs. 8, 12, and 13) includes a casing within which is mounted two valve members, each controlling a passage to the outlet 31 and pipe 27. A valve member 32 controls the passage of steam through the casing, and a second valve 33 controls the passage of water. Valve 33 is of identically the same construction as that of valve 32. The stems of these valves are surrounded by coil springs 34 which normally act to maintain the valves closed on their seats 35. The valves are alternately raised from their seats and held in their unseated positions for predetermined periods of time by means which will later be fully described.

Figures 14, 15:
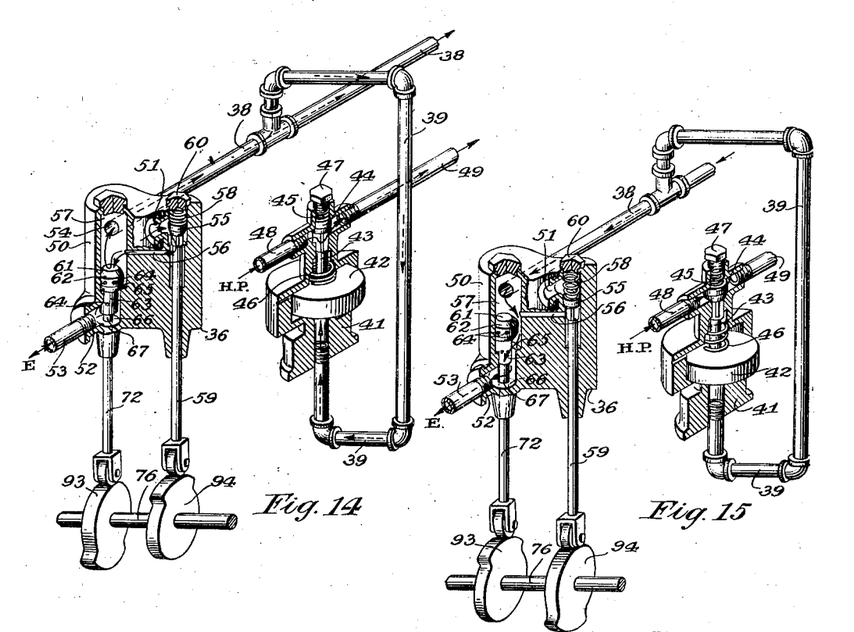
Fig. 14 is a fragmentary perspective view of a portion of the piping system used, and showing in section the high-pressure inlet-valve and the casing containing the low-pressure inlet-valve and the exhaust-valve, the latter being closed, and the arrows indicating the paths of travel of the fluids both to the press and to a point where the low-pressure fluid opens the high-pressure inlet-valve to permit the passage of high-pressure fluid to the press.
Fig. 15 is a similar view, the inlet-valve being closed and the exhaust-valve being open, the arrows indicating the path of travel of the fluid exhausting from the press.

Water or other fluid under pressure enters a valve casing 36 (Figs. 1, 6, 14, and 15) through a low-pressure inlet-pipe 37 (also marked "L. P.") and passing through the casing enters the press through a pipe 38, and moves the press into its closed position. After the press is closed, the pressure backs up through the pipe 38 and a branch 39, and the fluid under presure is carried down beneath the support 40 (Figs. 4, 14, and 15) and enters the valve 41 at its underside. As best shown in Figs. 7, 14, and 15, the fluid, when admitted to valve 41 impinges against the plunger or piston 42 which, by means of a stem 43, raises the valve-head 44 from its seat against the action of springs 45 and 46. Wear in the spring 45 may be taken up by means of an adjusting screw 47. Immediately the valve-head 44 is raised from its seat, fluid, under tremendously high pressure, passes from the high-pressure inlet-pipe 48 (also marked "H. P.") through the valve casing and into pipe 49 from whence it is delivered into the lead-in pipe 38 to be supplied to the press for causing the same to tightly squeeze the article being molded.

Valve 36 (Figs. 6, 14 and 15) includes the casing 50 having an inlet opening 51 with which pipe 37 connects, an outlet or exhaust opening 52 with which exhaust pipe 53 (also marked "E") connects, and a combined outlet and inlet opening 54 with which pipe 38 connects. A valve-head 55 controls communication between the inlet 51 and a cross-passage 56 leading into a chamber 57 which has free communication with the opening 54 and pipe 38. The valve-head 55 is held on its seat by means of a coil spring 58, and is adapted to be raised off its seat, to permit the passage of water, or other fluid, by means of a push-rod 59. An adjusting screw 60 is provided to take up wear in the spring 58.

A means indicated generally at 61 closes the passage between the exhaust or outlet opening 52 and the interior of the casing. This means includes a hollow head member 62 provided with a hollow stem 63 (Figs. 6 and 14). The side walls of the head 62 and the stem 63 are each provided with openings 64. The head 62 is seated on a shoulder 65 and cuts off communication between the chamber 57 and a smaller chamber 66. Also, the hollow head and stem, together with the openings 64, provide a passage between the chambers 57 and 66, when the head is seated on the shoulder 65. A pin 67 is fitted loosely in the stem 63 and has its disc-head 68 resting on a shoulder 69 and cutting off communication between the head member 62 and the stem 63. A coil spring 70 keeps the disc-head 68 in close engagement with the shoulder 69. A screw plug 71 is provided and may be adjusted to take up wear in the spring 70.

The head 62 is held on its seat by gravity and pressure of fluid on its upper side. A push-rod 72 is provided, and when raised elevates the pin 67 against the action of the spring 70. The fluid will then pass from the chamber 57 to the chamber 66 by way of the openings 64 and the hollow head 62 and stem 63. As the fluid enters the chamber 66, the pressure at the upper side of the head 62 will be reduced and the head may then be readily raised off its seat to permit the full flow of fluid through the exhaust pipe.

Mounted in bearings supported by brackets 73 and 74 (Figs. 2 and 10) beneath the support 40, are shafts 75 and 76, respectively. These shafts are mounted to be rotated either independently or simultaneously.

The adjacent ends of the shafts are arranged in proximity, they being each received within the hub portion of a sprocket-wheel 77 (Fig. 10) which is driven by a chain 78 from a small sprocket-wheel 79 keyed to a power-shaft 80. Wheel 77 is keyed to a sleeve 81 and is free to rotate therewith about the shafts. A clutch mechanism 82 is provided for connecting the sleeve 81 to the shaft 76 and thus establishing a driving connection between the shaft and the sprocket-wheel 77. A lever 83 pivoted intermediate its ends at 84, is adapted to be moved to shift the mechanism 82 to make or break the driving connection between the driving wheel and shaft 76.

Figure 10:
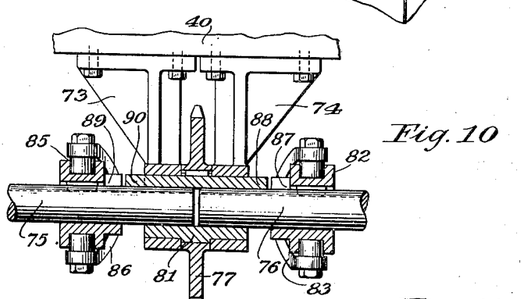
Fig. 10 is a sectional view showing the means whereby the presses may be independently operated.
Figure 11:
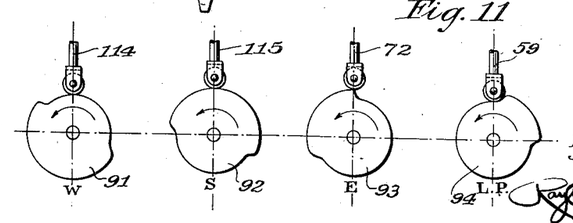
Fig. 11 is a view showing the relative positions of the operating cams for one press, the press being about to begin to close.

A clutch mechanism 85, movable by a pivoted lever 86, is adapted to make and break a driving connection between sprocket-wheel 77 and shaft 75, through sleeve 81.

The driving connection between the shaft 76 and the sleeve is brought about by shifting the clutch mechanism 82 so that the notch 87 thereof receives the lug or projection 88 of the sleeve. The clutch and sleeve will then rotate as a unit. A similar driving connection is formed between the clutch mechanism 85 and the sleeve 81 by shifting the mechanism 85 to have its notch 89 receive the lug 90 of the sleeve.

The sleeves of the clutch mechanisms 82 and 85 are secured to turn with the shafts 75 and 76 by means of keys secured to the clutch mechanisms and slidable in keyways in the shafts. In this way they are secured to turn with the shafts but may be moved longitudinally thereof for a short distance.

Cams 91, 92, 93, and 94 are mounted on each of the shafts to turn therewith, each of the cams of each shaft bearing a predetermined definite relationship to each of the other cams of the shaft whereby the steps of a pressing operation are automatically carried out due to cooperation of the cams with the valves previously described.

In the assembling of the timing apparatus, the cams are secured to collars which are preferably, although not necessarily, as illustrated in Fig. 3. Each of these collars is indicated by the numeral 95 and includes a hub portion 96 secured by means of a screw 97 to a sleeve 98 which, in turn, is secured by means of a screw 98ª to rotate with the shaft. The screw 98ª passes through and is countersunk in a spacing rib 98ᵇ formed integrally with the sleeve.

Each of the collars 95 is provided with a series of equally-spaced threaded openings 99. The cams are each provided with a series of openings 100 equally-spaced from each other and for a distance equal to five-fourths of the distance between the tapped openings 99 in the collars. In use, a bolt 101 is passed through the selected one of the openings 100, and is threaded into the selected opening 99. Any movement of the shaft will then be imparted to the cams. The difference in the spacing of the openings 99 and 100 provides for very fine adjustment of the cams.

A guard 102 is provided in position to prevent the insertion of the fingers between the jaws of the press after the lower jaw has moved into a position relatively close to the upper jaw. This guard also acts as a trip for a safety device so arranged that upon the guard being swung upward on its pivots 103, the exhaust-valve will be opened and the lower jaw 14 will gravitate into open position as the pressure is relieved.

An arm 104 (see Fig. 4) is secured to a short shaft 105 mounted in bearings 106 secured to the support 40. The arm is rigid with the shaft and the shaft is turnable in the bearings. A crank-arm 107 is rigidly secured to the shaft 105 and has a long lever 108 (see Fig. 5) secured thereto to move therewith. This lever 108 is provided at its free end with a weight 109. A pivoted trigger 110 is engaged in one of the notches 111 formed in the lower edge of the guard 102. The trigger 110 is connected with the lever 108 by means of a link 112 pivotally secured at its respective ends to the trigger and lever.

The arm 104 is positioned beneath a shoe 113 carried by the push-rod 72. Upon the guard 102 being swung upward, the trigger 110 is released and it and the link 112 swing downwardly together with the long lever 108 under the influence of the weight 109. The movement of the lever 108 must be with the short shaft 105 as an axis. The turning of the shaft imparts movement to the arm 104 and it engages and elevates the shoe 113 and the push-rod 72 to which it is attached. The upward movement of the push-rod 72 (Fig. 6) brings the same into engagement with the pin 67, and in the manner previously described, opens communication between the chambers 57 and 66 permitting the exhaust of the fluid under pressure and the opening of the press.

It is to be borne in mind that the operation of the safety device does not disrupt the timed relation between the units of the duplex press. The shafts 75 and 76 continue to rotate and the steam and water valves, as well as the low-pressure inlet valves, will be opened at regular intervals by the cams, until the power is cut off. However, until the guard is reset, the exhaust-valve of that press will remain open and water entering from the low-pressure line will not back up and open the high-pressure inlet valve. Consequently, that press will not only not move to closed position, but moreover will open, due to gravity acting on the lower jaw. Immediately upon the guard being reset, the press resumes its normal operation, in synchronism with its companion press.

It is to be noted that the lower edge of the guard 102 (Fig. 5) is positioned below the operating surface of the jaw 14 of the press, when the press is in closed position. In addition to preventing the insertion of the fingers between the jaws of the press when they are relatively close together, this guard structure is such that should the operator's hand be between the jaws of the press, his wrist, or arm, or other portions of his body will engage and elevate or swing the guard 102 before the press completely closes. Such elevating or swinging of the guard 102 will release and set in motion the elements of the safety means, as previously described, and the lower jaw of the press will gravitate to open position.

While the press is in open position, the cam 92 (Figs. 12 and 13) engages and elevates the push-rod 115 opening the steam-valve 32 and admitting the heating medium into the platens 21 and 22. During this time, and if necessary during the early stages of the movement of the lower jaw to closed position, the record materials are positioned in the press. As the record materials are being placed in the press, the cam 94 operates the push-rod 59, elevating the same and raising the valve 55 off its seat, thus permitting the passage of a fluid—preferably water—under low pressure (of say from 200 to 300 pounds) to the press, for the purpose of closing the same.

The water under low pressure backing up in the pipe 38 and branch 39, after the press has been closed, soon engages the plunger or piston 42 with sufficient force to elevate the same and raise the valve-head 44 off its seat and admit a fluid, preferably water, under high pressure (of say 1 or 2 tons) to the press for the purpose of squeezing the record material, while it and the platens are hot, with great force. The fluid under high pressure, after passing through the valve casing 41, is conducted to the press by the pipes 49 and 38.

The record is held in the press under the high pressure for a predetermined period of time, during the early part of which time steam is being passed through the platens. After the record has been sufficiently heated, and while still maintained under a tremendous pressure, the cam 92 rotates to release position and the steam-valve is closed; and at the same time cam 91 comes into action, elevating the push-rod 114, opening passage through valve 33, and admitting cold water to the press for the purpose of cooling the records to the point where they may be handled without injury.

Figure 12:
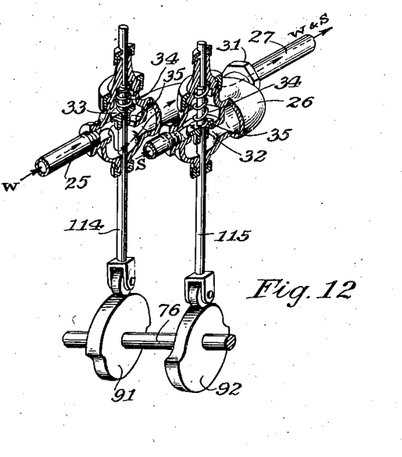
Fig. 12 is a fragmentary perspective view showing the multiple valve for controlling the passage of heating and cooling media, the valve being partly in section and showing the water passage open and the steam passage closed, the arrows indicating the path of travel of the water or other fluid used as a cooling medium.
Figure 13:
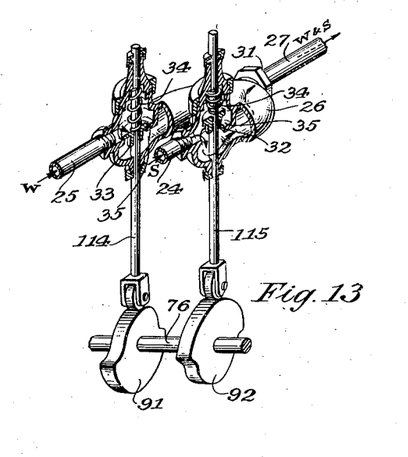
Fig. 13 is a similar view, but in opposite phase, the passage for the heating medium being open, and the passage for the cooling medium being closed, and the arrows indicating the path of travel of the heating medium.

After the lapse of a predetermined time interval, cam 93 (Figs. 14 and 15) acts to elevate push-rod 72, and so opens the exhaust-valve 62 in the manner previously described in detail. Immediately the pressure is relieved under the piston or plunger 42, the inlet-valve for the water, or other fluid, under high pressure, is closed, and as the pressure decreases, the lower jaw gravitates to open position. At this point, the platens are still being supplied with cold water. The finished record is now removed from the press, and as fresh record-material is being placed on the lower platen, cam 91 acts to close valve 33. (Figs. 12 and 13.) Simultaneously, cam 92 acts to again supply steam to the press platens.

It will be noted that each of the push-rods is, at its lower ends, equipped with a roller which rides upon its respective cam. With the exception of the roller carried by push-rod 72, the rollers are constantly in contact with their respective cams. The roller of push-rod 72 is in contact with the cam 93 except when the safety-device is operated, at which time it is raised above the cam.

Referring now more particularly to the diagrammatic views, Figs. 16 through 21, it will be noted that each duplex press includes a pair of identical presses marked "A" and "B" (formerly "10") together with the necessary piping systems. In the diagrammatic illustrations, the parts referred to by letters also have the numerals from the other views applied thereto.

Figure 16:
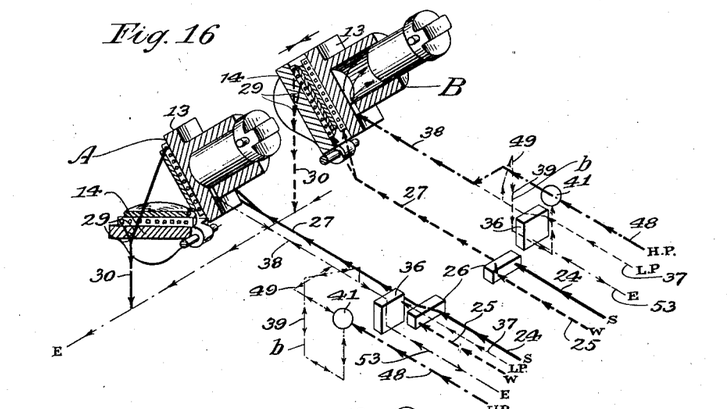
Fig. 16 is a diagrammatic view showing one press about to begin closing and the other about to begin opening, the fluids passing to the presses being indicated diagrammatically.

In Fig. 16, the press A is shown in open position and is being heated as indicated by the heavy solid line designated "S". Steam is being supplied to the press as it is about to close.

The press B is being cooled preliminary to opening. The cooling water is being supplied through a pipe indicated by the heavy broken line designated "W." Also, this press is being supplied with water under high pressure, as indicated by the heavy dot-and-dash line marked "H. P."

Figure 17:
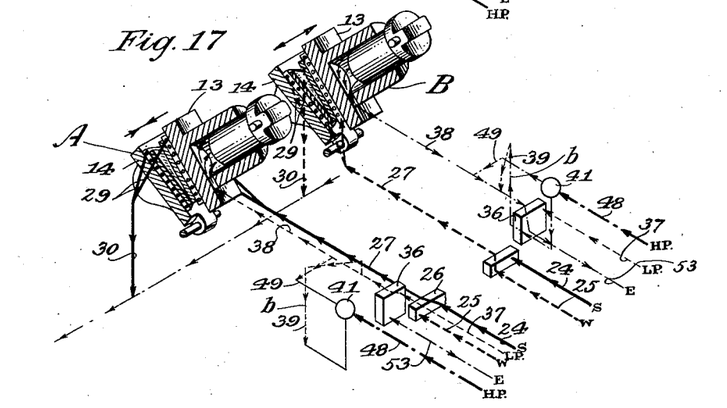
Fig. 17 is a similar view showing the presses as one is closing and the other is opening, the change in the fluids passing to the presses being indicated diagrammatically.

The press A of Fig. 17 is moving to closed position while the press B is moving to open position. As indicated by the heavy solid line S, the platens of press A are being supplied with steam. Also, the hydraulic ram is being elevated and is carrying with it the lower jaw of the press. Water under low pressure is being admitted to the press for the purpose of closing it, and the path of travel of such water is indicated by the light broken line L. P.

Press B of Fig. 17 is being supplied with cooling water, as indicated by heavy broken line W. Also, the water under pressure is exhausting from the press, the water travelling the course indicated by the light dot-and-dash line E.

The press A is being heated as it closes, such heating material expediting the pressing operation. As an additional means of saving time, the press B is being cooled as it is moving to open position.

Figure 18:
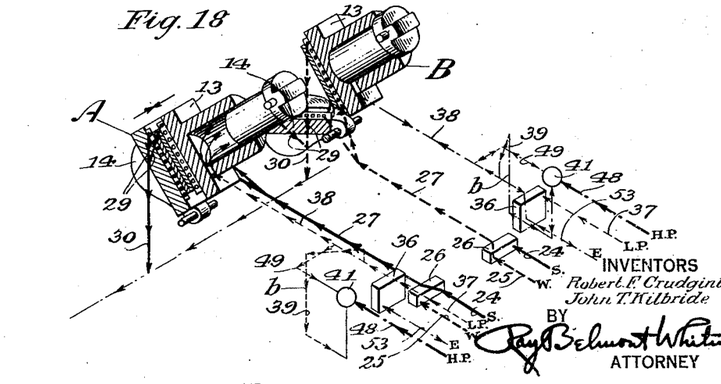
Fig. 18 is a similar view, the press units each being in a position opposite to that occupied by it in Fig. 16, the fluids that are being fed to the respective press units being indicated diagrammatically.

The third step in the operation of the duplex press is indicated in Fig. 18. Here, the press A has just completed closing, and the press B has just completed opening. Press A is under low pressure and is being heated, as indicated by the light broken line L. P. and the heavy solid line S, respectively. In press B, the pressure fluid has finished exhausting and the press is being cooled, as indicated by the heavy broken line W.

Figure 19:
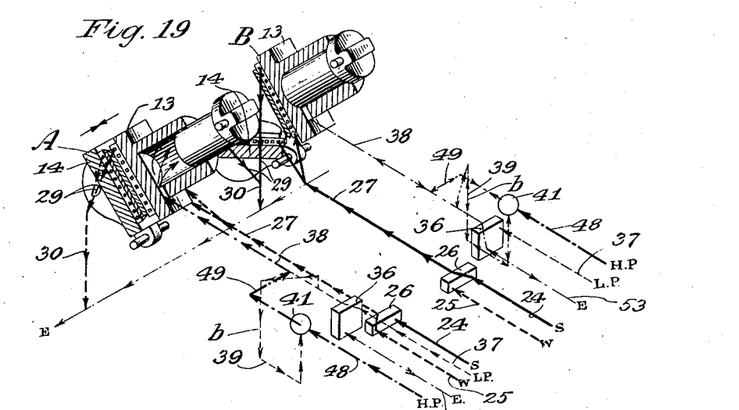
Fig. 19 is a similar view, the presses occupying the same positions as in Fig. 18, the difference in the fluids being indicated diagrammatically.

In Fig. 19, there is indicated the fourth step in the pressing operation. Steam is being supplied to press B preparatory to its closing. The steam line is indicated by the heavy solid line S. Press A is completely closed and is under high pressure, as indicated by the heavy dot-and-dash line H. P. Also, this press is being cooled preparatory to opening. The piping for the cooling fluid is indicated by the heavy broken line W. The line b indicates the path of travel of the fluid under low pressure which is used to close the press and open the valve 41 to permit the passage of fluid under high pressure to the press. The valve 41 is indicated by a circle.

Figure 20:
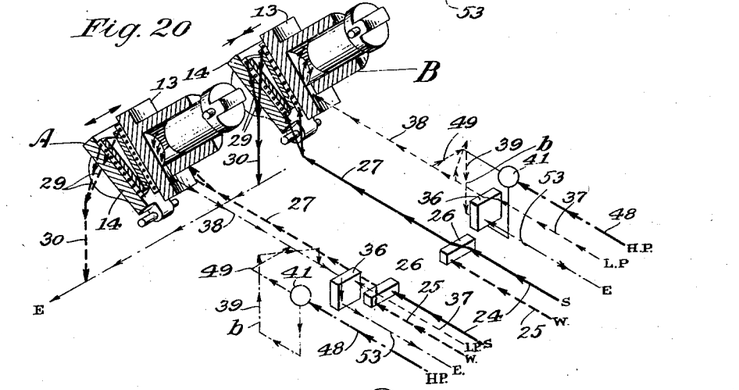
Fig. 20 is a similar view, the presses being in the positions occupied by them in Fig. 17 but the respective presses moving in opposite directions, the change in the fluids being diagrammatically indicated.

In Fig. 20, the press B is moving to closed position and the press A is opening. The platens of press B are being supplied with steam, as indicated by the heavy solid line S. Also, the press is being closed by fluid under low pressure, as indicated by the light broken line L. P.

In this figure, press A is opening, the pressure fluid exhausting therefrom, as suggested by the light dot-and-dash line E. Moreover, this press is being cooled, the cooling fluid travelling to the platens through pipes over the path indicated by the heavy broken line W.

Figure 21:
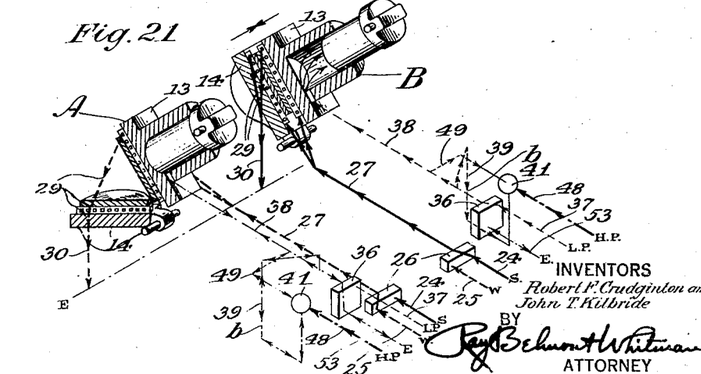
Fig. 21 is a similar view, the presses occupying the same relative positions as in Fig. 16, but being supplied with different operating fluids, as diagrammatically indicated.

The presses in Fig. 21 are in the same positions as in Fig. 16. However, in Fig. 21, the press A is being cooled, a cooling fluid being supplied thereto as indicated by the heavy broken line W. The press B is being heated and is under low pressure, as indicated by the heavy solid line S and the light broken line L. P., respectively.

The press B will be under high pressure, as in the case of Fig. 16, as soon as the fluid under low pressure backs up sufficiently to open valve 41. The passage of fluid to this valve is indicated by the arrows on the light broken line 39 in all the diagrammatic views.

The operation following that shown and described at Fig. 21, is that shown and described at Fig. 16. Thus, the series of steps just explained are repeated each time a record is made in each press unit.

For each cycle of operations as set out above, a record will have been completed in the press unit A and a record will have been removed from press unit B and a new batch of record material placed therein. The finished record will be removed from A while it is in the position shown in Fig. 21. A batch of raw record material will be substituted for a finished record in press B during the time it is in the position shown in Figs. 18 and 19.

From the foregoing, it will be seen that one of the presses is open when the other is closed. Due to this arrangement, one man can operate two presses, and without loss of time waiting for the cooling or other operations. The actual working of these presses demonstrates that they are about the "last word" in press equipment. Promptly upon one of the presses closing, the other opens. Their movements are so timed that by working along steadily, one man can conveniently operate the two presses.

This construction marks a notable advance in the art of pressing moldable material, which requires a time interval to elapse while the material is cooling, or otherwise curing, within the press. By means of this duplex press construction, the various operations being entirely automatic, and without any action on the part of the operator whatever, this cooling or curing interval of the press is bridged by having the two work together alternately, so that the operator is kept busy removing the complete molded article and re-filling one press while the cooling or curing operation goes on in the other. This practically takes up his complete time.

Another important feature of the press is the exact uniformity of its performance; this uniformity being controllable at will, however. Thus, granted a uniformity in the material fed to the press, and uniform conditions of temperature and pressure of the media used for heating and cooling (all of which features are readily controllable), the resulting product is bound to be of standard quality; for the time of action of each treatment performed during the several press cycles is always the same as similar previous treatments.

Nothing, then, is left to the human element, particularly in phonograph record manufacture, for which this invention was particularly adapted. Under former conditions, records were frequently either "hot pressed", resulting in sticking of the material to the platens; "cold pressed", resulting in imperfect molding; or the material itself was fed into the press under too hot or too cold a condition, bringing on other troubles known to the trade, and all making for a non-uniform and defective product. With the present equipment, such troubles are absolutely eliminated, and in addition, a known and governable schedule of production is maintained.

Moreover, this automatic operation of the presses may be altered in its details, at will, to conform with new conditions, such as a new batch of record material, requiring a longer heating interval, and so on. The novel form of cam adjustment is largely responsible for this.

As a result of the above, these presses have, in addition to the high quality and standardization of the product, a speed of operation practically double that heretofore, which means that labor cost per record or other article, pressed, is cut in two.

An essential feature of the press, and necessary by the very nature of its operation, is the safety device, adapted to prevent accidents to operators. This works entirely automatically, and eliminates all such trouble.

The combination of high and low pressure valve control, as here used, is a further basic innovation disclosed herein.

Heretofore, the individual sound record press units have always been constructed to close rapidly. This resulted in a high pressure being suddenly applied to the record material and the tearing or rupturing of the same as it is forced into place. It has been ascertained that better records are produced when the record material is slowly spread over the matrix before high pressure is applied thereto.

Further, in the manufacture of laminated records, a sheet of paper or other fibrous material, coated on its outer side with high-grade record material, is placed at each side of the biscuit of low-grade record stock. When pressure is applied to such a structure, the biscuit is flattened between the two sheets. If this material is flattened rapidly and with great force, the sudden movement thereof, in many instances, causes the splitting or rupturing of the sheets of paper or other fibrous substance embedded in the record.

Moreover, the rapid closing of the press causes the matrices to wear down rapidly. When the jaws close slowly, any comparatively large pieces of record material will be given a chance to adjust themselves in the press. The fragile matrices will not come into intimate contact with these large hard particles of material, when the press closes slowly, and wear on the matrices will be materially reduced.

The split sheets detract from the strength of the record and result in the record having one or more defective points. The jaws of the press forming the subject-matter of the present invention close very slowly and for this reason they gradually come into contact with and flatten out the record material. After the record has been shaped, it is subjected to high pressure and tightly squeezed in the press. In this way, the splitting of the fibrous sheets is prevented.

The area of the cylinder 15, as well as the weight of the ram 16 and jaw 14, together with the size of the inlet opening and pressure of the water, must be considered when computing the rapidity with which the press closes. In the present instance, these elements bear such a relationship to each other that the press closes very slowly.

Formerly, record presses were built to close rapidly to save time. The output of records per man is so increased by the use of these presses that it has been found feasible to lower the speed of the press somewhat, in order that records of high uniform quality may be produced.

While an embodiment of the invention has been shown and described in detail, it is to be distinctly understood that the invention is in no manner limited to the disclosure, it being obvious that many changes in the details of construction, and the arrangement of parts, may be made without departing from the scope of the invention as defined in the appended claims, and to which reference must be had for a definition of the limitations of this invention.

Having now described the invention, what is claimed as new and for which Letters Patent of the United States is desired, is:

1. In combination, a press, and a piping system including control valves and means for actuating the same, so arranged and constructed that the press is automatically closed by fluid under one pressure, held closed for a predetermined period by a fluid under a greater pressure, heated for a predetermined period while under the greater pressure, cooled for a predetermined period while under the greater pressure, and opened.

2. In a press, an exhaust-valve, a cam to actuate the exhaust-valve at regular intervals to permit opening of the press, and a guard adapted to be moved to release means for actuating the exhaust-valve independently of the cam.

3. In a press, an exhaust-valve, a push-rod adapted, when elevated to raise the exhaust-valve off its seat, a cam to elevate the push-rod at regular intervals, and a foot piece extending laterally from the push-rod and adapted to be engaged by an arm whereby the push-rod may be elevated and the exhaust-valve opened independently of the cam.

4. In combination with a press, a mechanically-operated valve adapted to admit fluid under low pressure to the press for closing the same, a valve adapted to be opened by the fluid under low pressure for admitting fluid under high pressure to the press for the purpose of tightly squeezing an article in the press, and other mechanically-controlled valves controlling the supply of heating and cooling media to the press.

5. In combination with a press, a cam-operated valve adapted to admit fluid under low pressure to the press for closing the same, a valve adapted to be operated by the fluid after the press is closed to admit fluid under high pressure to the press for the purpose of tightly squeezing an article in the press, and other cam-actuated valves for controlling the admission of a supply of heating and cooling media to the press.

6. In combination, a press, and a piping system including control valves and automatic mechanical means for actuating the same, so arranged and constructed that the press is automatically closed by fluid under one pressure, held closed for a predetermined period by a fluid under a greater pressure, heated for a predetermined period while under the greater pressure, cooled for a period in excess of the heating period and while under the greater pressure, and opened.

7. The method of molding a sound record consisting in placing the record material on a matrix and slowly applying pressure thereto for a definite time interval to spread it thereover, and then pressing it tightly thereagainst.

8. The method of pressing a sound record, consisting in subjecting the record stock to very low pressure for a predetermined time interval to shape it, and then after it is shaped subjecting it to a very high pressure for a definite time interval.

9. In combination, a press including a pair of units each provided with a platen and each having a cycle of operations including heating and cooling said platens while the units are closed, and means driving said units and causing them to open and close alternately.

10. In combination with a press including a pair of jaws, means for closing said jaws, means for pressing said jaws tightly together after they have been closed, automatic means for reducing the effectiveness of the second-named means after a predetermined interval, and said second-named means being so constructed that it becomes entirely ineffective upon having its effectiveness reduced.

11. In a press, an exhaust-valve, a cam to actuate the exhaust-valve at the end of a pressing operation, a guard, and a safety means operable on movement of the guard to actuate the exhaust-valve independently of the cam.

12. In a press, an exhaust-valve, a cam to actuate the exhaust-valve at regular intervals, a pivoted guard for the press, and a safety means operable on elevation of the guard to actuate the exhaust valve independently of the cam.

13. In a press, an exhaust-valve, a cam to actuate the exhaust-valve at regular intervals, and a trigger-released weight-actuated means to actuate the exhaust-valve independently of the cam.

14. The method of molding a sound record consisting in giving the record stock the general shape of a record while under one pressure which is maintained for a definite time interval, increasing the pressure of molding over that of shaping and maintaining the increased pressure for a definite time interval, heating the record stock while under the greater pressure and cooling the record while under the greater pressure.

15. The method of molding a sound record consisting in giving the record stock the general shape of a record while under one pressure, said pressure being maintained for a definite time interval, increasing the pressure on the record stock and maintaining the increased pressure for a definite time interval, heating the record stock while under the greater pressure, and cooling the record while under the greater pressure and for a period of time in excess of the heating period.

16. The method of forming a sound record consisting in shaping the record under a low pressure which is maintained for a definite time interval, increasing the pressure greatly, and maintaining the increased pressure for a predetermined time interval.

17. The method of forming a sound record consisting in slowly applying for a definite time interval a low pressure to the record stock to shape it, and then applying for a definite time interval a very high pressure.

18. In combination with a press having a pair of jaws and platens on the jaws, means for closing the jaws under one pressure, and for applying a greater pressure thereto after they are closed, and means for passing a heating medium through the platens while the jaws are closing and for a predetermined interval thereafter.

19. In combination with a press having a pair of jaws and platens on the jaws, fluid pressure means for closing the jaws under one pressure and for applying a greater pressure thereto after they are closed, means for passing a heating medium through the platens while the jaws are closing and for a predetermined interval thereafter, and means for passing a cooling medium through the platens upon the cutting off of the supply of heating medium.

20. In combination, a press, fluid pressure means to slowly close the press during a predetermined time interval, and means automatically operable at the end of said time interval for maintaining said press closed under a greater pressure and for a pre-determined time interval.

21. In combination, a press including platens, fluid pressure means to close the press under one pressure, means to maintain the press closed for a predetermined time interval but under greater pressure, and means for heating and cooling the platens while the press is under the greater pressure.

22. In combination, a press including a pair of units each provided with a platen and each having a cycle of operations including heating and cooling said platens while the units are closed, the period of cooling being greater than that of heating.

23. In combination with a press, a valve adapted to be opened to admit fluid under low pressure to the press for closing the same, a second valve adapted to be opened by the fluid under low pressure for admitting fluid under high pressure to the press for the purpose of tightly squeezing an article in the press, a third valve adapted to be opened to exhaust the fluid from the press, and said second valve adapted to automatically close upon the pressure of fluid in the press being reduced through the exhaust valve.

Signed at Bridgeport, in the county of Fairfield, and State of Connecticut, this 1st day of July, A. D. 1924.

ROBERT F. CRUDGINTON.
JOHN T. KILBRIDE.